INVENTOR.
Oscar J. Holmes
By: Loftus, Moore, Olson & Trexler attys

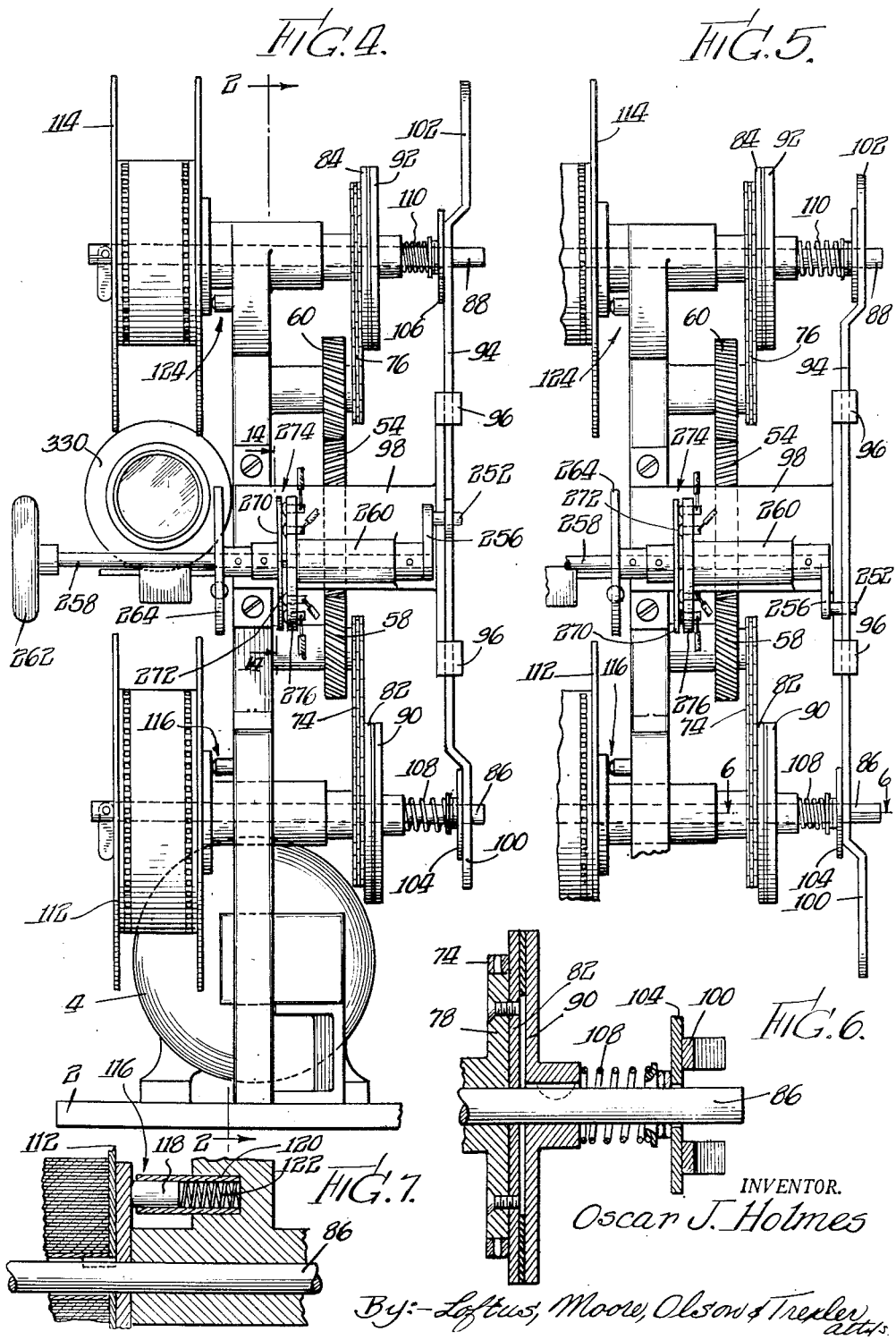

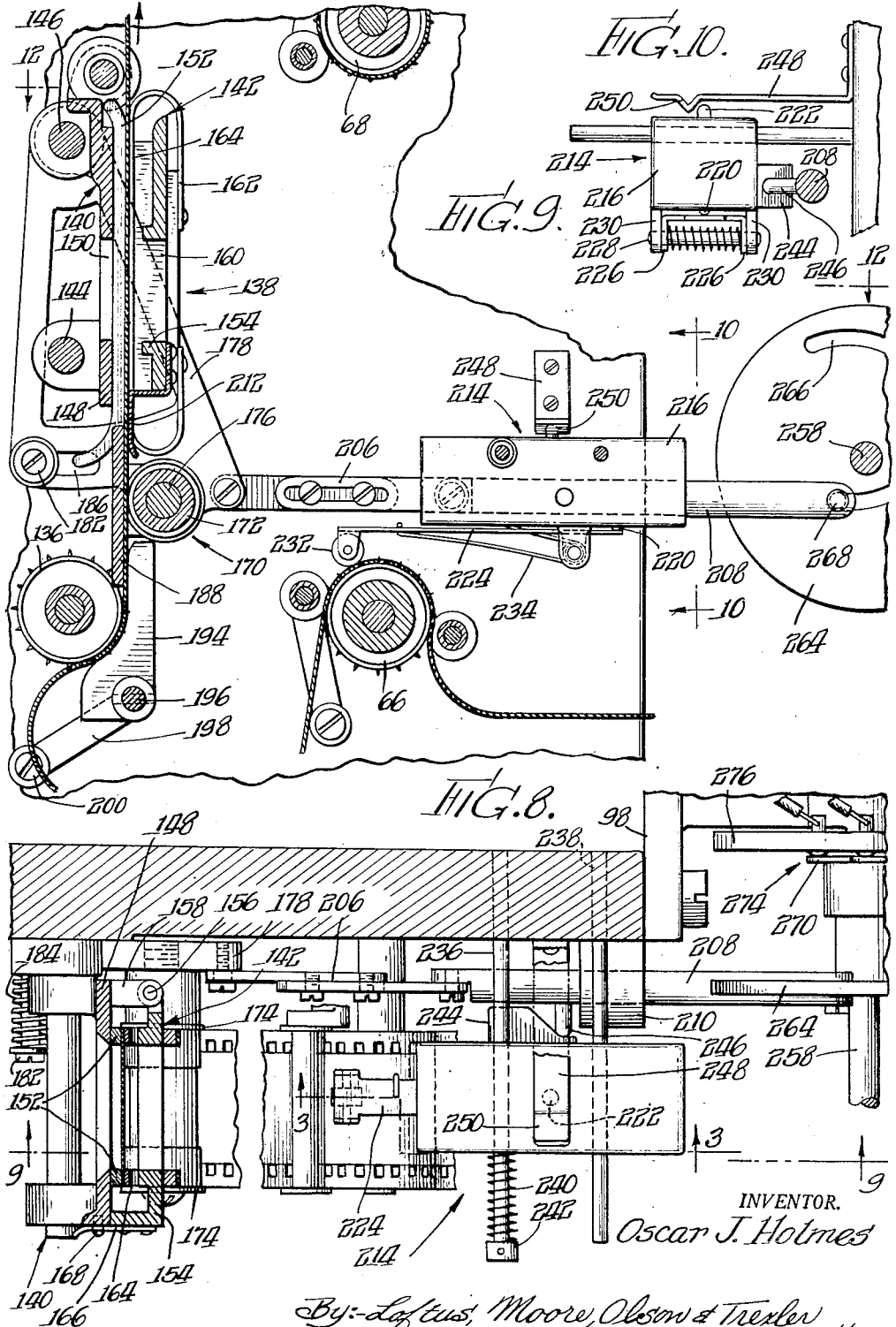

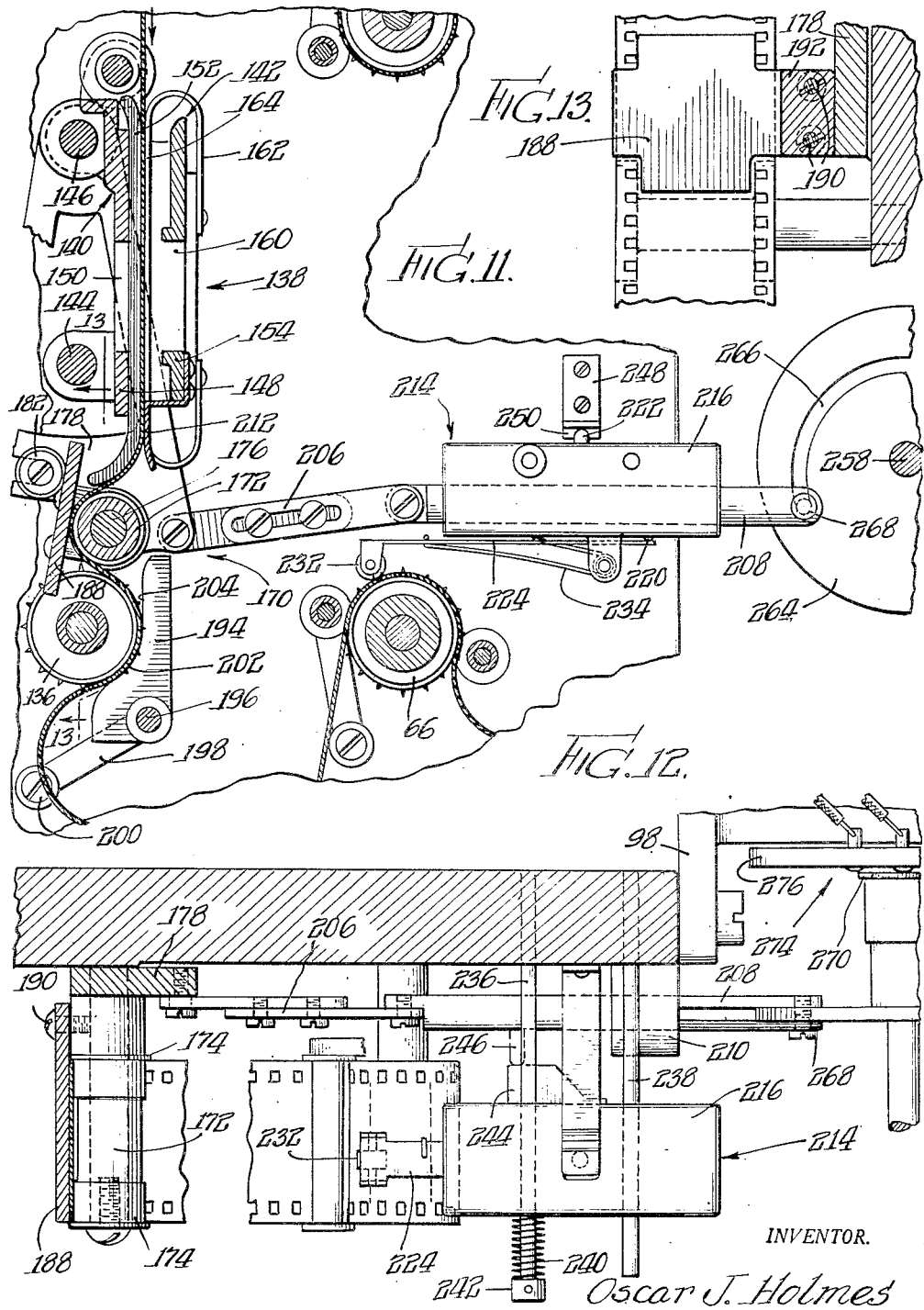

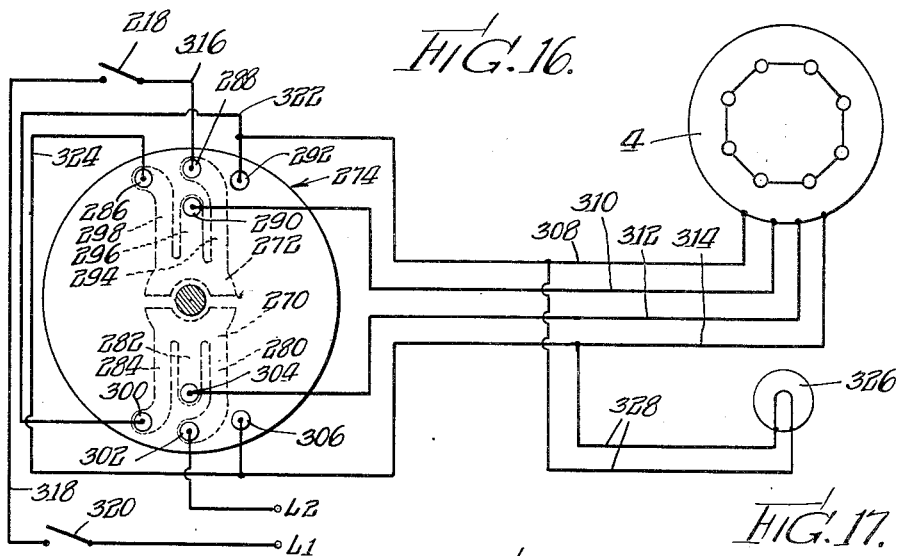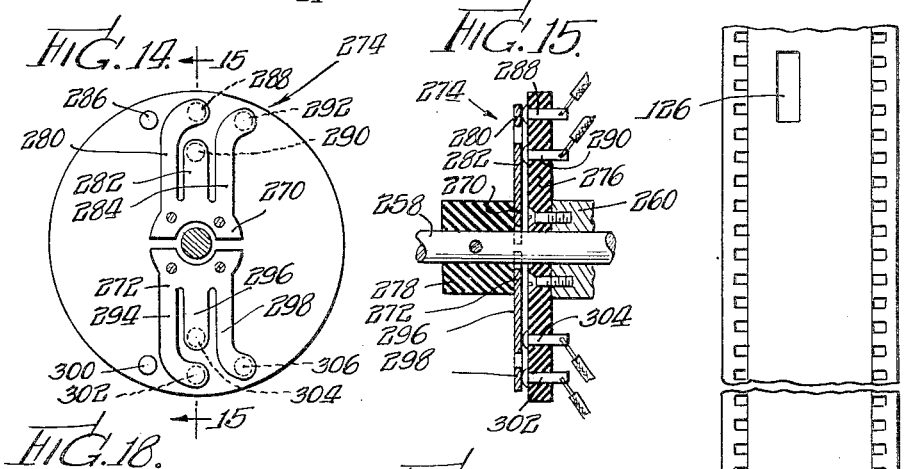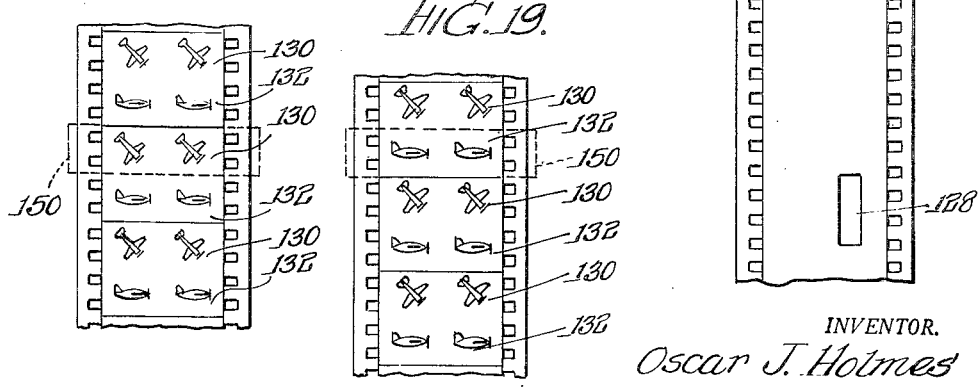

Patented May 2, 1950

2,505,965

UNITED STATES PATENT OFFICE 2,505,965

MOTION-PICTURE PROJECTOR FOR FILM WITH PICTURES IN ALTERNATE SERIES

Oscar J. Holmes, Chicago, Ill.

Application December 20, 1944, Serial No. 568,976

11 Claims. (Cl. 88—16)

This invention relates to a motion picture projector, and more particularly, to a motion picture projector of the repeating type.

It has heretofore been proposed to provide a motion picture projector of the repeating type by employing an endless or continuous film and such units have been constructed and offered commercially. Such units have not been entirely satisfactory, however, for a number of reasons, chief among which is the following: It is necessary with an endless film to take the film off of the roll or from the stack on the inside of the roll, for example, and feed it back to the outside of the roll, and since the outside of the roll is always larger than the inside, there is a constant slippage between each and every layer of the film as the roll is turned or the film fed therefrom. This causes an unnecessary wear on the film and introduces inconsistencies in the speed of feed of the film. The weight of the endless or continuous film itself puts an undue strain on the feed mechanism and it is necessary to maintain a very large tension on the film. All these factors decrease the useful life of the film and increase the cost of maintaining the feed mechanism in proper operating condition. Also, in the case of the endless film, the threading of the film through the projector is complicated by reason of the fact that the film must be returned to the same roll or stack from which it was withdrawn. It is accordingly an object of this invention to provide a motion picture projector of the repeating type which avoids the necessity for using endless film.

A further object of the invention is to provide a motion picture projector capable of projecting alternate series of pictures or frames when the film is driven first in one direction and then in the other.

A still further object of the invention is to provide a motion picture projector projecting every other picture or frame of the film when the film is driven in one direction and projecting the pictures or frames therebetween when the film is driven in the opposite direction.

A further important object of the invention is to provide a motion picture projector capable of driving and projecting film when driven in either direction.

The invention also seeks to provide a motion picture projector which automatically projects first one series of alternate pictures when the film is driven through the projector in one direction and automatically stops the movement of the film at a predetermined point along or at the end of the film and automatically projects another alternate series of pictures as the film is driven in an opposite direction.

It is also an object of the invention to provide in a motion picture projector capable of receiving a film wound in the conventional roll but having alternate series of pictures of opposite sequences, means for continuously and repetitiously projecting the pictures, first those of one sequence and then those of another sequence.

It is a further important object of the invention to provide in a motion picture projector automatic mechanism controlled by the film for terminating the movement of the film through the projector at predetermined points along the film or at the ends of the film and to project the film as it is driven in either direction.

The invention also contemplates the provision of a motion picture projector of the repeating type employing film wound on a roll in the conventional manner and threadable through the projector in essentially the same manner as is conventional in the use of non-repeating motion picture projectors.

Other and further objects and advantages of the invention will be apparent from the following description when taken in connection with the accompanying drawings, wherein:

Figure 4 is an end elevation of the projector of Figure 1;

Figure 5 is a fragmentary view similar to Figure 4 but showing the parts in a different position of operation;

Figure 6 is a view in horizontal section taken substantially along the line 6—6 of Figure 5;

Figure 7 is a fragmentary view in vertical section taken substantially along the line 7—7 of Figure 1;

Figure 8 is a fragmentary view in horizontal section taken substantially along the line 8—8 of Figure 1;

Figure 9 is a fragmentary view in vertical section taken substantially along the line 9—9 of Figure 8;

Figure 10 is a fragmentary view in vertical section taken substantially along line 10—10 of Figure 9;

Figure 11 is a fragmentary view similar to Figure 9 but showing the parts in a different position of operation;

Figure 12 is a fragmentary view similar to Figure 8 but showing the parts in a different position of operation;

Figure 13 is a fragmentary view in vertical section taken substantially along the line 13—13 of Figure 11;

Figure 14 is a view taken substantially along the line 14—14 of Figure 4;

Figure 15 is a view in vertical section taken along the line 15—15 of Figure 14;

Figure 16 is a schematic diagram of an electric circuit forming a part of the projector of Figures 1 to 15;

Figure 17 is a plan view of a film illustrating the control cut-outs in the film;

Figure 18 is a plan view of a section of film illustrating the arrangement of the pictures thereon and their positioning with respect to a schematically indicated projection aperture; and Figure 19 is a view similar to Figure 18 but showing the film in shifted position for the projection of another series of pictures through a schematically indicated projection aperture.

Figure 1:
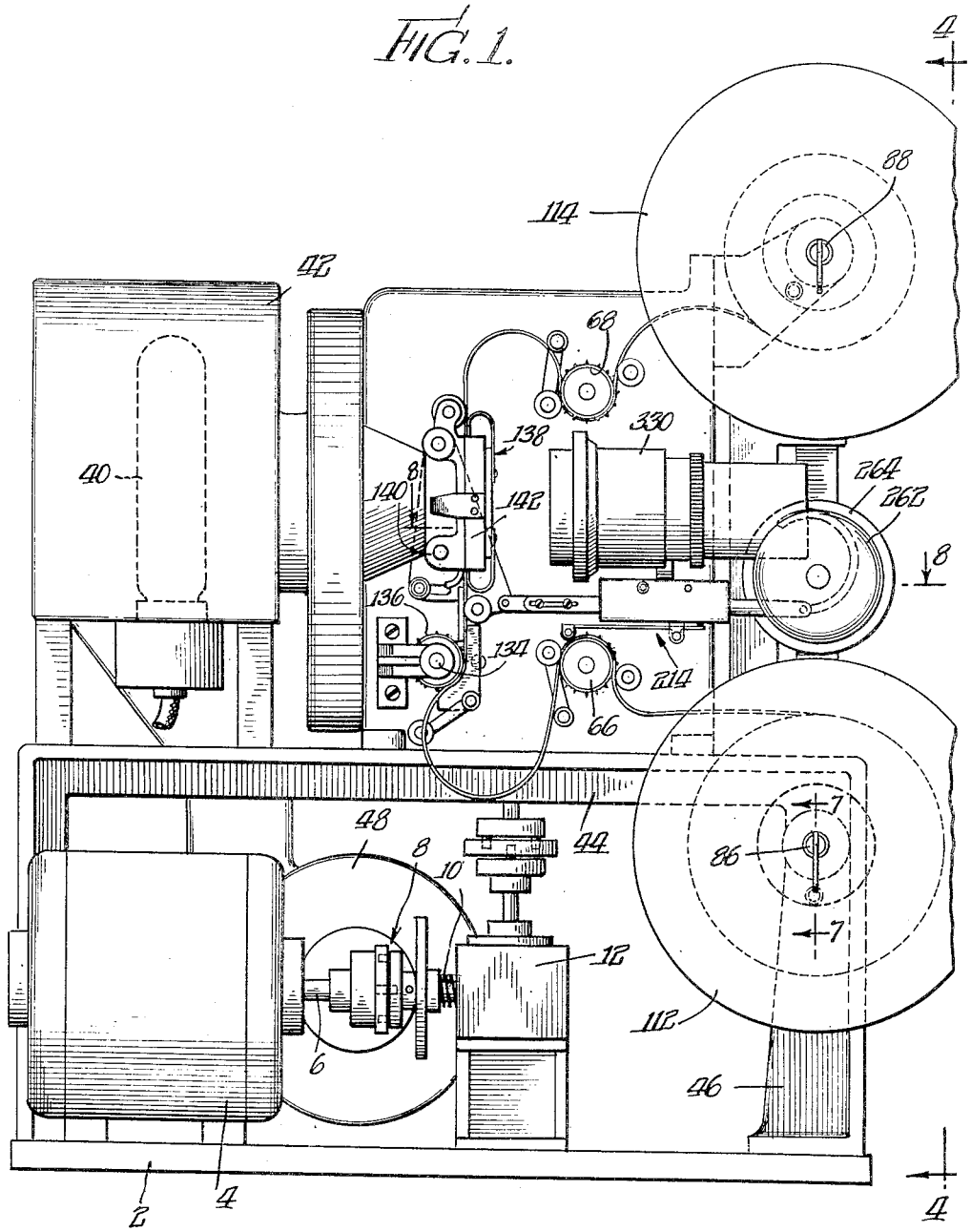
Figure 1 is a view in side elevation of a motion picture projector embodying the invention.

As shown in the drawings, a motion picture projector embodying the invention comprises the usual bed plate 2 (Figure 1) on which is mounted the usual drive motor 4 having its shaft 6 connected through clutch mechanism 8 to a stub shaft 10 projecting into gear box 12, in which a worm 14 (Figure 2) on the shaft meshes with a worm wheel 16 on the vertical drive shaft 18. The shaft 18 is connected through clutch mechanism 20 to a vertical shaft 22. The shaft 22 drives in the conventional manner an intermittent motion mechanism 24 of any desired construction, and a shutter mechanism 26 which may be of any desirable or conventional structure. To accomplish this the shaft 22 has a worm 28 meshing with a gear 30 on the drive shaft 134 of the intermittent motion mechanism, and also carries at its upper end another worm 34 engaging the worm wheel 36 on the shutter driving shaft 38.

The shutter mechanism, which for purposes which will be presently apparent may be made with blades of greater angular width than is conventional, controls the intermittent projection of the beam of light from the usual projection lamp 40 mounted in the conventional lamp housing 42 supported on the horizontal shelf 44 of a bracket 46 carried by the bed plate 2 and this lamp housing may be force ventilated by an air blower 48 driven by the motor 4

Figure 2:
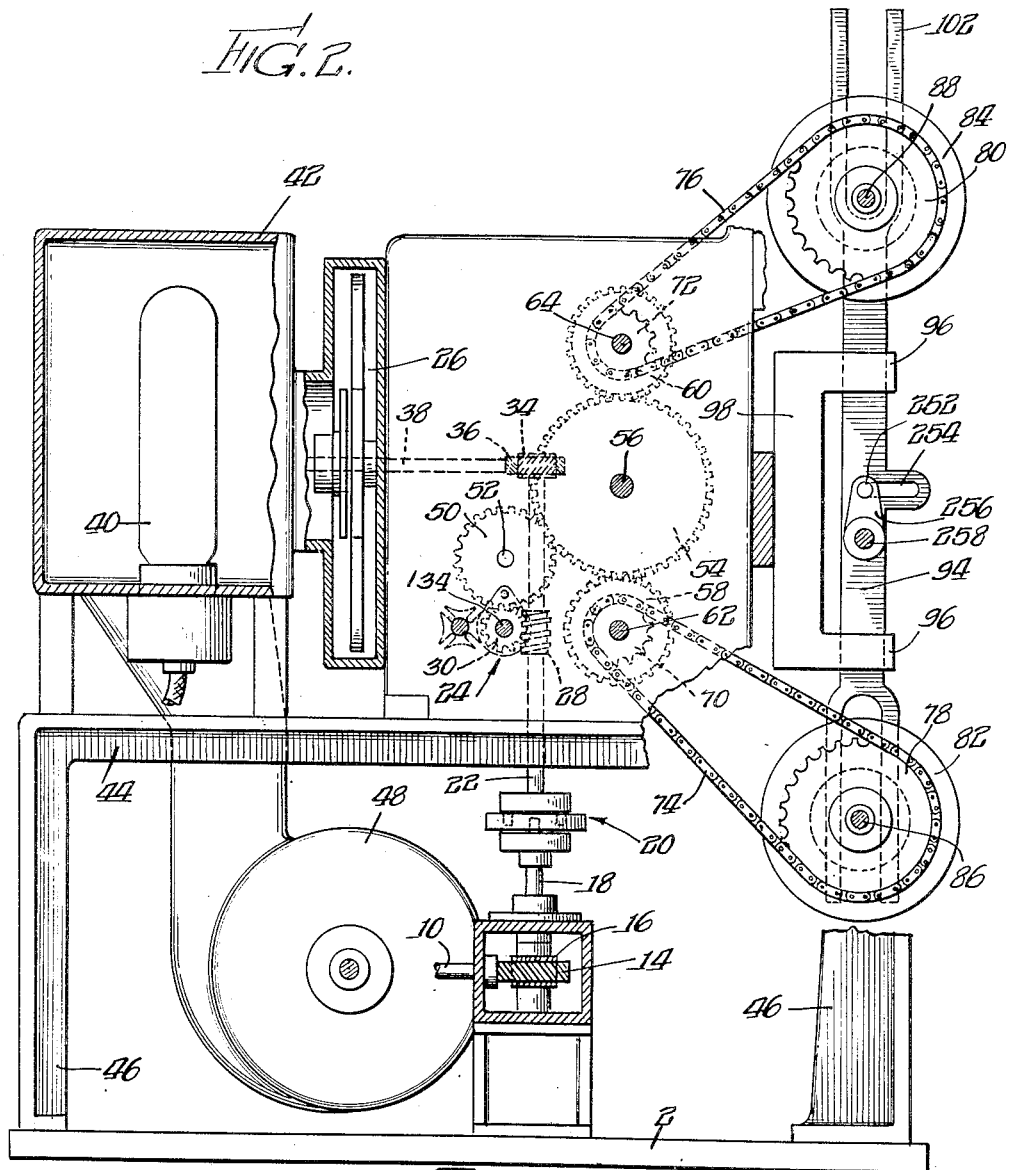
Figure 2 is a view in vertical section taken substantially along the line 2—2 in Figure 4 with certain parts being additionally broken away for purposes of illustration.

The gear 30 also meshes with a gear 50 mounted on shaft 52, the gear 50 also meshing with the gear 54 mounted on shaft 56. The gear 54 in turn meshes with driven gears 58 and 60 secured to driving shafts 62 and 64 for film feeding sprockets 66 and 68, respectively (Figure 1). The shafts 62 and 64 also have secured thereto sprockets 70 and 72 (Figure 2) connected by drive chains 74 and 76 to sprockets 78 and 80 fastened to the hubs of friction clutch plates 82 and 84 (Figures 4 and 5). These clutch plates are journaled on reel shafts 86 and 88, respectively, and cooperate with clutch plates 90 and 92, respectively, splined on the shafts 86 and 88.

The clutches 82—90 and 84—92 are alternately rendered operative to drive their reel shafts by a manually adjustable control bar or means 94 slidably mounted in the spaced arms 96 of a C-shaped bracket 98 fastened to the frame of the projector. The control bar or means 94 has at its opposite ends bifurcated sections or yokes which receive the shafts 86 and 88. These bifurcated sections or yokes have portions which are coplanar with the plane of the major portion of the control bar and end portions 100 and 102 which are offset outwardly from the plane of the control bar. The control bar provides a backing for hubbed washers 104 and 106 slidably fitting on the shafts 86 and 88. Between these washers and the clutch plates 90 and 92, coil springs 108 and 110 are interposed to urge the clutch plates axially of the shafts into driving engagement with the companion clutch plates 82 and 84. When the control bar is in raised position, as shown in Figure 4, the body of the control bar compresses the spring 110 which maintains the clutch plate 92 in driving engagement with the plate 84. While in this position, the spring 108 is in expanded position and, hence, the clutch plate 82 is free to rotate relatively to the clutch plate 90. When the control bar is in lowered position, as shown in Figure 5, the control spring 108 is compressed and thus urges the clutch plate 90 into driving engagement with the clutch plate 82. While in this position, the spring 110 is expanded and the clutch plate 84 is free to rotate relatively to the clutch plate 92.

The shafts 86 and 88 are formed in the usual manner releasably to receive the film reels 112 and 114 for rotation with the shafts. As shown in Figure 7, a constant drag is imposed on the film reel 112 by means of a friction brake 116 comprising a rounded head plunger 118 slidably mounted in a tube 120 set into the mounting bracket for the shaft 86, the plunger being constantly maintained in frictional engagement with the reel by a spring 122 in the tube behind the plunger. A like brake mechanism 124 (Figures 4 and 5) imposes a constant drag on the reel 114. These brake mechanisms 116 and 124 assure the uniform feeding of the film to the reels; maintain the film in proper tension for feeding and prevent the reels from becoming self-driving and from being spun to unwind the film as the film is withdrawn therefrom.

The roll of film which is used in this machine is comprised of the film shown in Figures 17 to 19. As shown in Figure 17, the film is provided, adjacent its opposite ends, with control cut-outs or slots 126 and 128, these slots being offset laterally of the film and automatically controlling the stopping of the film driving mechanism, as will presently appear. As shown in Figures 18 and 19, the film carries two series of alternate pictures or frames, one series of which comprises alternate pictures or frames 130, and the other series comprises alternate pictures 132. As shown, each picture or frame is of normal width but approximately one-half of the normal height. In other words, consecutive pictures or frames 130 and 132 are printed on an area of the film equal to the present normal picture area for a film of the particular width employed.

The driven shaft 134 (Figure 1) of the intermittent motion mechanism 24 carries at its outer end the usual intermittent sprocket 136, and this sprocket intermittently feeds the film through a film gate 138. This film gate comprises, as best shown in Figures 1, 8, 9 and 11, a stationary member or casting 140 and a hinged member or casting 142. The stationary part of the gate is mounted on studs 144 and 146 and comprises a plate 148 having a picture projection aperture 150 and film supporting bars 152 secured to or formed on the outer surface of the plate. The hinged section of the gate comprises a casting 154 hinged, as by pin 156, to a lug 158 projecting outwardly from the stationary casting. The casting 154 is formed with a picture projection aperture 160 aligned with the aperture 150. A pair of aperture gate tension springs 162 are secured to the outer surface of the casting 154, or to bars secured to said casting, and are looped over the top and bottom ends of the casting to form a pair of film tensioning and supporting straps 164 which press and hold the film against the non-resilient supporting bars 152.

The film supporting bars 152 are curved rearwardly at their upper and lower ends, as shown in Figures 9 and 11, to facilitate threading the film when the hinged gate casting is open and to avoid the presentation of sharp corners to the film as it is moved over these bars. A resilient strap 166 (Figure 8) is secured to the hinged gate casting 154 and forms a latch which cooperates with the latch pin 168 on the stationary gate section to hold the gate closed against the opening action of the film tensioning springs 162. The film is pulled down through the gate by the intermittently driven sprocket 136 when the supply of film is taken from the upper reel 114 by the sprocket 68 and is pushed up through the gate by the intermittent sprocket 136 when the supply is taken from the lower reel 112 by the sprocket 66. As the film is pulled down through the gate the uneven numbered pictures, i. e., the series of pictures 130, is projected and when the film is pushed up through the gate, the even numbered pictures, i. e., the series of pictures 132 is projected.

In order to frame the pictures with respect to the projection apertures when converting from one direction of feed to the opposite direction of feed and to permit upward pushing of the film through the gate, the machine is provided with a combined framing and film supporting guide mechanism 170. This mechanism comprises a framing roller 172 having a relieved surface to minimize the area of contact of the roller with the surface of the film and having end annular flanges or washers 174 forming guide flanges engaging the opposite edges of the film. This framing roller is rotatably mounted on a stud 176 having an end portion threaded into a segmental casting 178. This segmental casting is journaled on the stud 146 adjacent the upper edge of the film gate and is guided and held in adjusted position by a headed pin 182 and a spring 184 surrounding the shank of the pin. The pin 182 is received in an arcuate slot 186 adjacent the lower edge of the casting 178 and a washer, not shown, is pressed by the spring 184 against the face of the casting so as frictionally to maintain the casting in adjusted position. The casting 178 also carries a film backing and supporting plate 188 of a length to extend from the intermittent sprocket to and between the film supporting bars 152 when the plate is positioned as shown in Figure 9. As shown in Figure 13, the plate 188 is secured to the segmental casting 178 as by screws 190 passing through the plate and received in a bracket 192, in turn fastened in any convenient manner (not shown) to the casting.

The plate 188 is formed centrally of sufficient width to support the entire film, while the opposite edge portions are reduced in width to overlie only the picture area of the film so that the plate may extend between the film supporting bars 152 and between the sprocket wheels of the intermittent sprocket 136 which engage the sprocket holes at the opposite sides of the film. With this plate cooperates a film supporting shoe 194 (Figures 9 and 11) mounted by a pin 196 on the outer end of a link 198 pivoted, as by pin 200, to the machine frame and urged by a spring (not shown) in a counterclockwise direction to maintain the shoe in engagement with the film. The inner surface of the shoe 194 is shaped to form a central arcuate portion 202 concentric to the axis of the intermittent sprocket shaft and a vertical surface 204 cooperating with the plate 188 in holding the film straight and unbuckled when the plate is in the position shown in Figure 9.

The segmental casting 178 is adjusted from the position shown in Figure 9 to the position shown in Figure 11 by means of an adjustable linkage 206 pivoted at one end to the casting and at the other end to a rod 208 slidably guided in a bracket 210 (Figures 8 to 12) secured to the machine frame. When the rod 208 is moved to the left from the position shown in Figure 9, the segmental casting 178 is swung in a clockwise direction to carry the framing roller and the film backing plate 188 to the left to the position shown in Figure 11. The roller, when thus moving, pulls the film down through the gate, the linkage 206 being preadjusted to so predetermine the extent of movement of the framing roller that the film is moved downwardly through the gate a distance corresponding to the framing distance, i. e., the width of each picture or frame of the film. Let it be assumed that the film is positioned as shown in Figure 19, with respect to the diagrammatically indicated projection aperture 150 when the framing roller and film supporting plate are positioned as shown in Figure 9. Then on movement of the rod 208 to the left, as described, the picture 130 will be aligned with the projection aperture 150, as shown in Figure 18. In order to assist in the support of the film and prevent buckling thereof when it is being fed upwardly, the hinged section of the film gate 138 is provided with a film backing plate 212 which may be resilient in character and which holds the film, above the framing roller, against the plate 188. The plate 212 is formed with a laterally bent portion and an upwardly bent portion, which latter is bolted to the outer face of the casting 154 of the hinged section of the film gate.

Figure 3:
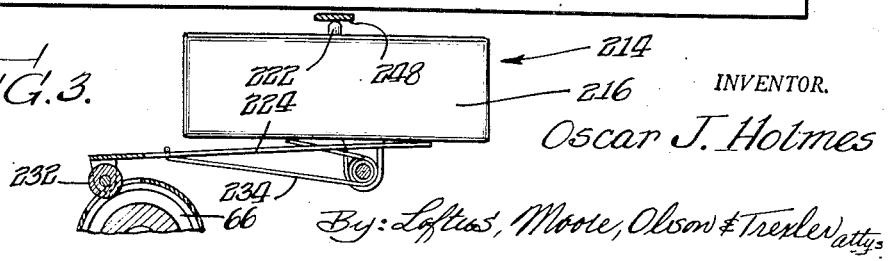
Figure 3 is a view in vertical section taken along the line 3—3 of Figure 8.

The control cut-outs 126 and 128 of the film cooperate with a control switch unit 214 (Figures 8, 9, 11 and 12) to terminate automatically the feeding of the film. The control switch unit 214 preferably comprises a housing 216 in which is mounted a "Micro" switch 218, schematically shown in Figure 16. Such switch includes the conventional switch opening plunger 220 (Figures 9 and 11) and switch closing or resetting plunger 222, the plunger 220 projecting through the housing from the lower side thereof and the plunger 222 projecting through the housing from the upper side thereof. A resilient switch operating bar 224 is formed with depending lugs 226 (Figure 10) receiving a pivot pin 228 carried by depending lugs 230 of the housing 216. One end of the bar engages the plunger 220 and the opposite end of the bar carries, between depending lugs, a roller 232 which normally rests upon the surface of the film as it passes over the sprocket 66. A spring 234, coiled about the pivot pin 228, has one end which engages the housing and the other end which hooks over the resilient switch operating bar 224. This spring 234 urges the bar in a counterclockwise direction, as seen in Figures 3, 9 and 11.

The switch housing is slidably mounted for movement laterally of the film to align the roller 232 first with one control cut-out of the film and then with the other. This mounting for the housing comprises a pair of rods 236 and 238 which are secured to the machine frame and pass through suitable guide bushings (not shown) in the housing so that the housing may move along the rods. A coil spring 240 is mounted on the outer end of the rod 236 and is interposed between a collar 242 and the outer wall of the housing so as to urge the switch housing inwardly. A cam block 244 (Figures 8 and 12) is fastened to the inner surface of the housing and is formed with high and low portions between which is interposed an inclined active surface which engages a pin 246 carried by the rod 208. When the rod is moved to the left, the pin 246, cooperating with the cam 244, will move the housing outwardly and when the rod is moved in the opposite direction, the pin as it passes the inclined surface of the cam allows the spring 240 to move the housing inwardly.

A switch closing or resetting bar 248 is secured to the machine frame and extends over the housing as it is moved inwardly and outwardly along the guide rods. This bar is formed at its outer end with a generally V-shaped cam 250, best seen in Figure 10. As the housing is moved inwardly or outwardly the switch resetting plunger 222 engages the V-cam 250 and is depressed thereby to close or reset the "Micro" switch 218.

The control bar 94 is raised and lowered by a crank pin 252 (Figures 2, 4 and 5) engaging in a slot 254 extending laterally of the control bar. The pin 252 is carried by a crank 256 fixed to the end of an adjusting shaft 258 journaled in a bearing block 260 (Figure 4) provided by the bracket 98 and provided at its outer end with an adjustment knob 262 (Figure 4). A disk cam 264 (Figures 1, 4, 8, 9, 11 and 12) is secured to the adjusting shaft 258. This disk cam is formed with a spiral cam slot 266, the disk being received in the forked end of the rod 208, as best seen in Figures 8 and 12, and the slot receiving a cross pin 268 carried by the rod. It will be evident that as the cam disk is rotationally adjusted, the rod is moved backwardly and forwardly.

The adjusting shaft 258 also carries operating blades 270 and 272 (Figures 14 to 16) of a reversing switch 274 which comprises, in addition to the blades, a contact carrying disk 276 of insulating material fastened to the bearing block 260. The blades 270 and 272 are riveted or otherwise fastened to an insulating block 278 keyed or pinned to the shaft 258. The blade 270 is formed with a plurality of contact fingers 280, 282 and 284, cooperating with a series of contact pins 286, 288, 290 and 292 carried by the disk 276. The blade 272 is similarly formed with a plurality of contact fingers 294, 296 and 298, cooperating with a series of contact pins 300, 302, 304 and 306, also carried by the disk 276.

The drive motor 4 is preferably an alternating current split-phase reversible motor and is connected to the alternating current supply lines, as best shown in Figure 16. Such a motor is provided with four supply leads 308, 310, 312 and 314. The motor leads 308 and 310 are connected directly to the contact pins 292 and 290 respectively. The motor leads 312 and 314 are connected to the contact pins 304 and 306 respectively. The contact pin 288 is directly connected by wire 316 to one terminal of the "Micro" switch 218 and the other terminal is connected by wire 318 to one terminal of a master hand switch 320 having its other terminal connected directly to the supply line L—1. The other supply line L—2 is connected directly to the contact pin 302. Contact pin 292 is interconnected by wire 322 to contact pin 300 and contact pin 286 is interconnected by wire 324 to contact pin 306. With the switch in the position shown in Figure 16, the motor lead 308 is connected to the supply line L—2 through wire 322, contact 300, fingers 284 and 280 of switch blade 270 and contact pin 302. The motor lead 310 is connected to the supply line L—1 through contact pin 290, fingers 296 and 294 of switch blade 272, contact pin 288, wire 316, "Micro" switch 218, wire 318 and master switch 320. The motor lead 312 is connected to the supply line L—2 through contact pin 304, fingers 282 and 280 of switch blade 270 and contact pin 302. The supply line 314 is connected to supply line L—1 through wire 324, contact pin 286, fingers 298 and 294 of switch blade 272, contact pin 288, wire 316, "Micro" switch 218, wire 318 and master switch 320.

When the switch blades are rotated through an angle of 180 degrees, to the position shown in Figure 14, the motor lead 308 will be connected to supply line L—1 through contact pin 292, fingers 284 and 280 of switch blade 270, contact pin 288, wire 316, "Micro" switch 218, wire 318 and master switch 320. The motor lead 310 will remain connected to the supply line L—1, since the contact pin 290 will then be connected to the contact pin 288 through the fingers 282 and 280 of the switch blade 270. The motor lead 312 will remain connected to the supply line L—2, since the contact pin 304 will be connected to the contact pin 302 by the fingers 296 and 294 of the switch blade 272. The motor supply lead 314 will now be connected to the supply line L—2 through contact pin 306, fingers 298 and 294 of switch blade 272 and contact pin 302. Hence it will be clear that on swinging of the switch blades through an angle of 180 degrees, the motor leads 308 and 314 will be reversed in respect to their connections to the supply lines L—1 and L—2, while the motor lead 310 will remain connected to the supply line L—1 and the motor lead 312 will remain connected to the supply line L—2; therefore, on such movement of the switch blades, the motor will be energized for rotation first in one direction, when the switch is positioned as shown in Figure 16, and in the opposite direction when the switch is positioned as shown in Figure 14.

An indicating lamp 326 may be connected to any two motor leads of always opposite polarity, thus, for example, the lamp 326 may be connected by wires 328 to motor leads 308 and 314 respectively, or the wires 328 may be connected to the motor leads 310 and 312. When so connected, the lamp indicates the operative condition of the motor circuit. If the wires 328 are connected to motor leads which, when the switch is in one position, are of opposite polarity and, when the switch is in its other position, are of the same polarity, the lamp may be used to indicate the direction in which the film is being fed through the machine for when the leads to which the lamp is connected are of the same polarity, the lamp will, of course, be extinguished.

The operation of the machine is as follows: A roll on which the film is already wound is placed on one of the reel shafts 86 or 88. Let it be assumed that the reel containing the roll of film is placed on the shaft 88. A leader of film is withdrawn from the roll and threaded first over the combined take-up and feed sprocket 68 and then through the film gate 138, over the intermittent sprocket 136 and the combined take-up and feed sprocket 66 and attached to the now empty reel 112.

Let it be assumed that the motor at this time is energized for feeding in a forward direction to drive the feed sprocket 68, the intermittent sprocket 136 and the take-up sprocket 66 in a direction to feed the film down through the film gate. The cam 264, when the motor is energized in such forward direction, will be positioned as shown in Figures 11 and 12, so that the frame roller is in the position shown in said figures. The "Micro" switch 218 is closed and the housing 216 of this switch is in the position shown in Figure 12. The reversing switch mechanism 274 is in the position shown in Figure 16. The control bar 94 is in the position shown in Figure 5. Hence the film is framed for projection of the series of pictures 130 by downward movement of the film through the film gate. When the switch housing is positioned so that the roller is aligned with the path of the control cut-out 126, the motor is energized in a forward direction to so drive the sprockets 66 and 68 and the intermittent sprocket 136 as to feed the film from the upper reel 114 and down through the film gate and to wind it upon the bottom reel 112, the shaft of which is driven through its clutch plates 82 and 90. When the control cut-out 126, at a predetermined point along the film, preferably adjacent one end of the film, arrives at the switch roller 232, the spring 234 urges the roller down through the cut-out to the surface of the sprocket, and the consequent counterclockwise movement of the switch bar 224 raises the plunger 220 of the switch mechanism 214 and opens the "Micro" switch 218. This effects the deenergization of the motor 4 by opening the connections of the motor leads 308 and 314 to the supply line L—I. The adjustment knob 262 is now rotated in such a direction as to rotate the cam 264 in a counterclockwise direction, as seen in Figure 11, to the position shown in Figure 9. The cam in so rotating moves the rod 208 to the right to move the framing roller and the film backing and guide plate 188 to the right so that the inner face of the plate 188 is aligned with the outer faces of the film supporting and guiding bars 152 of the film gate 138. As the rod 208 moves to the right, the pin 246 reaches and moves downwardly relatively to the inclined surface section of the cam 244 and allows the spring 240 to move the switch housing 216 inwardly to the position shown in Figure 8, in which the switch operating roller 232 is aligned with the path of movement of the control cut-out 128 in the film. As the housing moves inwardly, the raised closing or resetting plunger 222 of the switch engages the outer face of the depending V-cam section 250 of the bar 248 and is depressed thereby to close or reset the "Micro" switch 218 to closed position.

The motor is not energized at the instant that the "Micro" switch is closed by the resetting action of the V-cam 250 because during such movement of the cam 264 the switch blades 270 and 272 of the reversing switch mechanism 274 are out of engagement with all of the contact pins and, hence, the motor circuit is not completed until the adjustment knob approaches its final limit of movement at which time the switch blades engage the respective contacts, as shown in Figure 14, to reenergize the motor for rotation in the reverse direction. During the rotation of the adjustment knob, and before the knob has completed its full limit of movement, the control bar is moved upwardly to the position shown in Figure 4, in which position the spring 108 is allowed to expand and the spring 110 is compressed so that the clutch, comprising the plates 82 and 90, is effectively disengaged while the clutch plates 84 and 92 are urged into driving engagement so that the lower reel 112 is not driven by the motor, but the reel 114 is driven by the motor.

The rotation of the adjustment knob through 180 degrees having been completed and the switch blades 270 and 272 having been brought to the position shown in Figure 14, the motor is now energized for driving in the reverse direction to rotate the sprockets 66 and 68 and the intermittent sprocket 136 in a direction to feed the film up through the picture gate 138. The sprocket 66 now acts as a feed sprocket, withdrawing the film from the lower reel 112, as shown in Figure 1, and supplying it to the intermittent sprocket 136 which intermittently pushes the film up through the picture gate. The picture gate, the framing roller 172, the film supporting and backing plate 188 and the shoe 194 cooperate to maintain the film straight so that it may be pushed upwardly by the intermittent sprocket without buckling. The sprocket 68 now acts as a take-up sprocket from which sprocket the film is wound on the upper driven reel 114. The series of pictures 132, which of course are taken in reverse sequence relative to the series of pictures 130, are now projected. The pictures are, of course, projected by the usual projection lens system 330 mounted on the machine frame.

It will be evident, of course, that the series of pictures 130 and the series of pictures 132 may be alternately projected in continuous repetition for any desired purpose, as for continuous projection of films for training purposes, for coin controlled machine purposes, or for any other purpose for which repetitious operation of the projector without change of film between each projection may be desired.

It will be further evident that a reel of film may be placed on or threaded through the machine in the well-known conventional manner, since the film is not endless and does not double back upon itself, as is the case of known projectors of the repetitious type.

It will be evident from the foregoing description that applicant has provided a motion picture projector of the repeating type which avoids the necessity of using an endless film; that is capable of projecting alternate series of pictures or films when the film is driven first in one direction and then in the other; that is capable of receiving a film wound in the conventional roll and threadable through the projector in essentially the same manner as is conventional in the use of non-repeating motion picture projectors; and that has an automatic mechanism controlled by the film for terminating the drive of the film through the projector at predetermined points along the film or at the ends of the film and to project the film at it is driven in either direction. It is obvious that numerous changes may be made in the form, construction and arrangement of the several parts without departing from the spirit or scope of the invention or sacrificing any of its attendant advantages, the forms herein described being preferred embodiments for the purpose of illustrating the invention.

I claim:

1. A motion picture projector comprising picture projection means, means for feeding a film having plural series of interspersed pictures, said feeding means comprising means for intermittently moving the film past the projection means a distance corresponding to the distance between pictures of the same series, and shiftable-position film framing means for engaging and shifting the film relative to the picture projection means and independently of said feeding means to frame a selected series of pictures to be projected with respect to the picture projection means.

2. A motion picture projector comprising picture projection means, means for feeding in one direction past the picture projection means a film having series of alternate pictures in opposite sequence whereby on feeding the film in said one direction one of the series of pictures is projected, means for feeding the film in the opposite direction past the picture projection means to project the other series of pictures of opposite sequence, and two-position framing means shiftable independently of said feeding means and engaging adjacent opposite sides of the film for shifting the film relative to the picture projection means between opposite feedings of the film, and said shiftable framing means being operable to frame the film for the projection of one series of pictures on feeding of the film in one direction and to frame the film for the projection of the other series of pictures on feeding of the film in the opposite direction.

3. A motion picture projector comprising picture projection means, a two-position framing means for framing relative to the picture projection means a film having two series of alternate pictures in opposite sequences to select the series of pictures to be projected, means independent of said framing means for feeding said film past the projection means in one direction to project a series of pictures of one sequence or, selectively, in the opposite direction to project the other series of pictures of reverse sequence, means for shifting said framing means independently of said feeding means from one to the other of its two positions, and control means for rendering the said feeding means operative to feed the film in the direction corresponding to the position of said framing means.

4. A motion picture projector comprising picture projection means, means for feeding past the picture projection means a film having plural series of interspersed pictures, reversible means for selectively driving said feeding means in one direction or in an opposite direction, a two-position framing means shiftable independently of said feeding means for engaging and shifting the film relative to the picture projection means to select the series of pictures to be projected, and control means for positioning said framing means and simultaneously selecting the direction of drive of said feeding means in accordance with the position of said framing means.

5. A motion picture projector comprising picture projection means, means for feeding past the picture projection means a film having plural series of interspersed pictures, reversible means for selectively driving said feeding means in one direction or in an opposite direction, two-position framing means for framing the film relative to the picture projection means to select the series of pictures to be projected, means selectively positionable laterally relative to the film to stop said driving means on completion of the projection of a series of pictures when the film is fed in either selected direction, means associated with the film adjacent opposite side edges thereof for controlling said stopping means, and control means operatively connecting said stopping means and said framing means for selectively positioning said stopping means in accordance with the position of said framing means and the direction of drive of said feeding means.

6. In a motion picture projector, picture projection means, means adapted to receive a supply roll of film having plural series of pictures, each series comprising spaced pictures with the pictures of each series interspersed with the pictures of the other series, an intermittent motion mechanism for intermittently pulling the film from the supply roll through the picture projection means in one direction or, selectively, pushing the film through the picture projection means in the opposite direction, means for receiving the film from the picture projection means, electric motor means for selectively driving the film feeding means in one direction or in an opposite direction, two-position film framing means for engaging and shifting the film relative to the picture projection means to select the series of pictures to be projected, two-position direction control means for said electric motor means, and manually operable control means coordinating the positioning of said film framing means and said direction control means to select simultaneously the series of pictures to be projected and the direction of drive of the film feeding means.

7. In a motion picture projector, picture projection means, reel receiving shafts, reversible film feeding means for pulling or, selectively, pushing a film through said picture projection means, a reversible electric motor for driving said film feeding means, said reel receiving shafts having clutch means for selectively connecting one or the other of said reel shafts to said motor in accordance with the direction of feed of the film, said shafts being adapted to receive a reel of film having two series of alternate pictures of opposite sequence, two-position framing means for framing the film relative to the picture projection means to project one or the other series of the alternate pictures in accordance with the direction of feeding of the film by said film feeding means, control means selectively determining the direction of operation of said motor, and means operatively connected to said control means for positioning said framing means in accordance with the setting of the control means.

8. In a motion picture projector, reel receiving shafts adapted to receive a reel of film having two series of alternate pictures of opposite sequence, an electric motor, means including a pair of clutches positioned on said reel receiving shafts for connecting said motor to said reel shafts, means having two operable positions for rendering one of said clutches ineffective and the other effective when in one position and rendering the other of said clutches effective and said one clutch ineffective when in another position, means including a reversing switch for controlling the direction of operation of said electric motor, picture projection means, means including a reversible intermittent motion mechanism for feeding the film from a reel on one of said shafts to a reel on the other of said shafts, means connecting said motor to said film feeding means whereby said film is pulled through the picture projection means by said intermittent motion mechanism when the motor operates in one direction, said film being pushed through the picture projection means by said intermittent motion mechanism when the motor operates in the opposite direction, means connected to said reversing switch and said clutch control means for determining the direction of operation of the motor and connecting the proper reel shaft to the motor, a framing mechanism having two positions of operation in one of which the film is framed relative to the picture projection means for projection of one of said series of pictures and in the other of which the film is framed relative to the picture projection means for projection of the other of said series of pictures, and control means for positioning said framing means simultaneously with the setting of said reversing switch and to that position of its two positions corresponding to the setting of the reversing switch.

9. In a motion picture projector, means including a film gate, reversible film feeding means for intermittently pulling a film to be projected through said gate or selectively pushing the film to be projected through said gate, a reversible prime mover for driving said film feeding means, said feeding means including an intermittent motion mechanism spaced from said gate, film supporting and guiding means supporting the film between the intermittent motion mechanism and the picture gate to permit pushing of the film through the picture gate by said intermittent motion mechanism, means for shiftably mounting said film supporting and guiding means to effect a framing of the film relative to the picture gate when the same is shifted, means including a reversing switch for controlling the direction of operation of the electric motor, and means for shifting said reversing switch and connected to said mounting means to shift the same simultaneously with the setting of said reversing switch.

10. In a motion picture projector, means including a film gate, reversible film feeding means for intermittently pulling a film to be projected through said gate or selectively pushing the film to be projected through said gate, a reversible prime mover for driving said film feeding means, said feeding means including an intermittent motion mechanism spaced from said gate, film supporting and guiding means supporting the film between the intermittent motion mechanism and the picture gate to permit said pushing of the film through the picture gate, means for shiftably mounting said film supporting and guiding means to effect a framing movement of the film relative to the picture gate when the same is shifted, means including a reversing switch for controlling the direction of operation of the electric motor, means for shifting said reversing switch and connected to said mounting means to shift the same simultaneously with the setting of said reversing switch, means controlled by the film for automatically cutting off the motor when either series of pictures has been projected, said means including a shiftable member in one position being effective to cut out the motor when the film is fed in one direction and in the other position being effective to cut out the motor when the film is fed in the opposite direction, and means connecting said shiftable member to said switch for positioning said shiftably mounted film support and guide means simultaneously with the setting of the switch member.

11. In a motion picture projector, means including a film gate, reversible film feeding means for intermittently pulling the film to be projected through said gate, or selectively pushing the film to be projected through said gate, a reversible prime mover for driving said reversible film feeding means, said feeding means including an intermittent motion mechanism spaced from said gate, film supporting and guiding means supporting the film between the intermittent motion mechanism and the picture gate to permit said pushing of the film through picture gate by said intermittent motion mechanism, and means for shiftably mounting said film supporting and guiding means to provide a framing of the film relative to the picture gate when said supporting and guiding means is shifted.

OSCAR J. HOLMES.

REFERENCES CITED

The following references are of record in the file of this patent:

UNITED STATES PATENTS

| Number | Name | Date |
| --- | --- | --- |
| 691,493 | Rosenberg | Jan. 21, 1902 |
| 1,024,661 | Wright | Apr. 30, 1912 |
| 1,188,114 | Thomas | June 20, 1916 |
| 1,423,452 | Power | July 18, 1922 |
| 1,563,394 | Owens | Dec. 1, 1925 |
| 1,698,105 | Owens | Jan. 8, 1929 |
| 1,698,106 | Owens | Jan. 8, 1929 |
| 2,049,944 | Carpenter | Aug. 4, 1936 |
| 2,173,768 | Sabol et al. | Sept. 19, 1939 |
| 2,196,738 | Nagel | Apr. 9, 1940 |

FOREIGN PATENTS

| Number | Country | Date |
| --- | --- | --- |
| 155,006 | Great Britain | Dec. 6, 1920 |
| 637,962 | Germany | June 15, 1932 |